Jan. 21, 1930.  D. G. MACKENZIE  1,744,655
VEHICLE AXLE
Original Filed Feb. 10, 1926
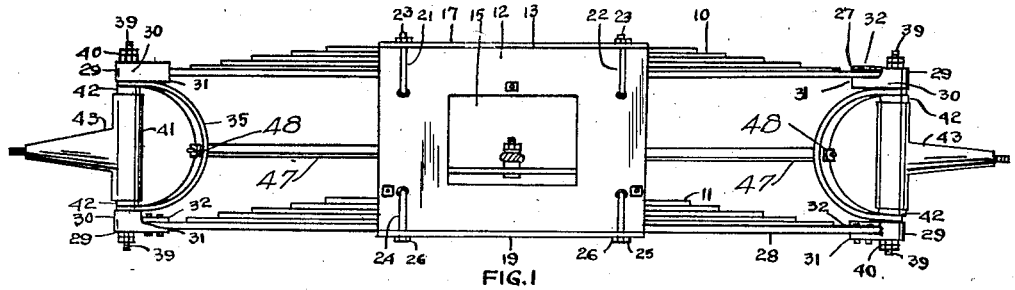
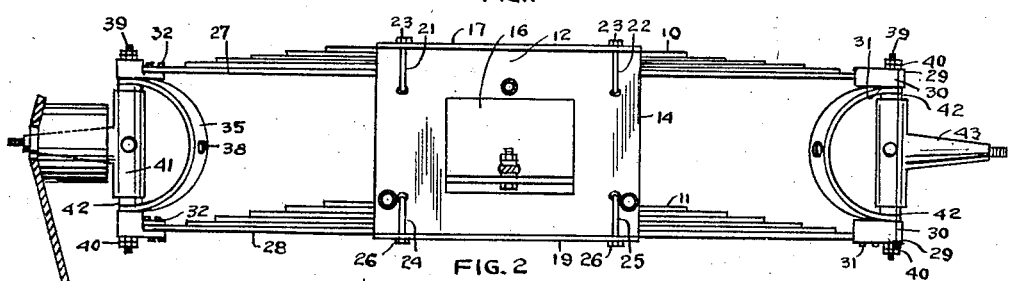
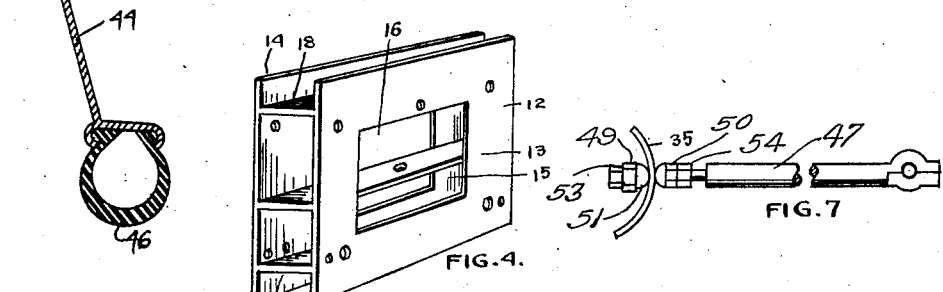
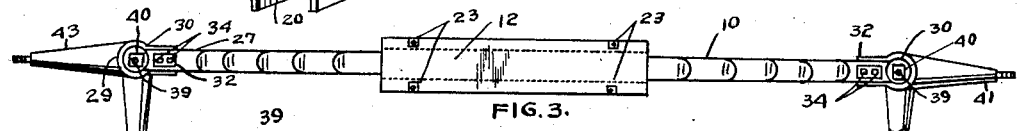
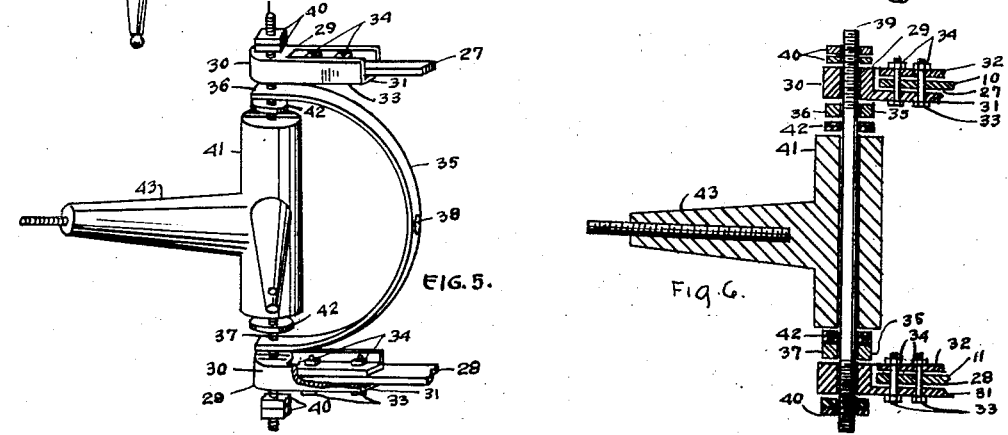

Patented Jan. 21, 1930

1,744,655

UNITED STATES PATENT OFFICE

DONALD GORDON MACKENZIE, OF MONTREAL, QUEBEC, CANADA, ASSIGNOR TO DON-MAC PRODUCTS CORPORATION, OF NEW YORK, N. Y., A CORPORATION OF DELAWARE

VEHICLE AXLE

Application filed February 10, 1926, Serial No. 87,217. Renewed February 8, 1929.

The invention relates to vehicle axles, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to absorb the shocks incident to meeting and passing over obstructions, cuts and other roughnesses on roads and pavements and thereby save the body of the vehicle and the operating mechanism from the ill effects of severe vibrations and jolts; to reduce tire work; to reduce the cost of construction and maintenance in motor vehicles; to greatly increase the available space for passengers; to facilitate the steering of motor vehicles in permitting a wide sweep of the wheel axles and thus avoid many accidents and the resulting expense and at the same time enable the driver to find the way through heavy traffic with considerable ease; to eliminate the rigidity of chassis construction, to lower the centre of gravity of the vehicle; to produce the complete axle structure at a minimum cost and free of complicated parts; to greatly increase the stability of the vehicle at high speeds; to reduce wheel chatter; and generally to provide an efficient and durable vehicle part.

In the drawings, Figure 1 is a front elevation of the axle structure.

Figure 2 is a rear elevation of the axle structure.

Figure 3 is a plan view.

Figure 4 is a detail of the central distancing bracket.

Figure 5 is a detail of an enlarged end distancing post and frame connection.

Figure 6 is a sectional detail of an enlarged king post.

Figure 7 is a detail showing a preferable form of the fastening of a torque rod and its rocking pivot connection.

Like numerals of reference indicate corresponding parts in the various figures.

Referring to the drawings, the parallel leaf springs 10 and 11 form the axle members of the axle structure and in themselves may be of conventional construction built up of gradually shortening bars or leaves as customary.

The central bracket 12 is preferably formed of the front and rear parallel plates 13 and 14 having the central openings 15 and 16 for lightening purposes, and the upper clamping plates 17 and 18 and the lower clamping plates 19 and 20.

The U-shaped clamping straps 21 and 22 extend under the plate 18 between the plates 13 and 14 and through the latter plates and upwardly through the plate 17 and the spring 10 is laid on the plate 18 and bound in between the plates 17 and 18 by the clamping straps 21 and 22 which have bolt ends projecting through the plate 17 and held by the nuts 23.

The inverted U-shaped straps 24 and 25 hold the spring 11 tightly between the plates 19 and 20 in a similar manner to the fastening of the spring 10, said straps being secured by the nuts 26.

The long leaves 27 and 28 respectively form the bases of the springs 10 and 11, the shorter leaves being built up on the upper surfaces of said long leaves.

It will thus be seen that the plates 13 and 14 of the central bracket form the distancing members for the springs 10 and 11 which are hung between the said plates at the upper and lower ends thereof by means of the U-shaped straps and clamping plates suspended from said distancing plates.

The clamps 29 are each formed of a socket end 30 having a rigid clamping plate 31 projecting therefrom, which coacts with the loose clamping plate 32 in holding the ends of the long leaves 27 and 28 by means of the bolts 33 and nuts 34 inserted through corresponding bolt holes in plates and springs, suitable means being used to avoid breakage of the leaves in or near the brackets.

The yokes 35 are formed with the pivot holes 36 and 37 adjacent to the ends and the pivot hole 38 in the centre of each of the yokes 35 for the reduced ends of the torque rods 47 on which the nuts 48 are mounted to hold said rods to said yokes. In Figure 7 the preferable way of joining a torque rod to a yoke is shown in which the nuts 49 and 50 have rounded heads 51 and 52 abutting the yoke and these nuts are locked by the nuts 53 and 54, all of the nuts being screwed on the reduced end of a torque rod and holding the yoke between the heads in the pivot hole, which is large enough to permit a reasonable play for a reduced end.

The king posts 39 are inserted through the sockets of the clamps 29 through the pivot holes 36 and 37 of the yokes 35 and secured by the nuts 40.

The axle spindles 41 are journalled on the king posts 39 and the adjustable thrust bearings 42 are introduced between the yoke ends and the upper and lower ends of the spindles 41, the latter having the wheel axles 43 projecting therefrom.

This completes the structure and from the central distancing member and the yokes, the vehicle frame members project and it will be readily understood from this description that the tying of this structure to a frame stabilizes both the frame and spring axles and yet leaves the maximum resiliency, and a minimum of dead weight. The springs and general assembly being floated or carried as live load cushioned from direct road shock.

In use these springs act in the manner of any springs so far as the absorption of the shocks is concerned, but they do not act between the two non-resilient surfaces, such as the rigid axle and the body as prevalent in motor car construction, instead they offer no bottom to the knock other than their suspension from the body through the frame, therefore the body, the frame and the springs are so intimately associated as to constitute a unitary resilient member hung from the wheels quite reversing the common practice of introducing the flexibility between the axles and the body and in place introducing the flexibility between the wheels and the body on the frame, which is broadly the salient feature of the invention though there are many specific features of great importance.

The wheels 44 and 45 are inwardly offset to bring the treads 46 directly under the clamps 29, therefore the springs are supported over the road contact points by the wheels in a direct vertical line, materially easing the transverse spring strain in its travel and the steering is facilitated by the fact that the king post axis means also are within the area of road contact.

The absence of shackles from the springs is of especial note in this invention, as it removes the serious effects of loose and broken shackles, as well as eliminating the rattling due to the same cause.

What I claim is:—

1. In vehicle axles, a plurality of parallel springs, distancing posts separating said springs and forming axle bearing supports rigidly clamped to the ends of said springs at the top and bottom thereof.

2. In vehicle axles, a structure comprising parallel springs rigidly locked to the ends of axle posts carried by wheels forming the running pivot supports of said structure.

3. In vehicle axles, a structure comprising parallel springs and a central spacing member binding the springs into a unit in operation, distancing end posts fixedly secured to the springs, axles having bearings journalled on said posts and wheels carrying said posts and springs and forming pivot supports for the structure.

Signed at Montreal, Canada, this 16th day of November, 1925.

DONALD GORDON MACKENZIE.